Nov. 18, 1952  G. KAST  2,618,406
ELECTRONIC PICKUP CONTROL FOR GRAVIMETRIC FEEDERS
Filed March 9, 1950
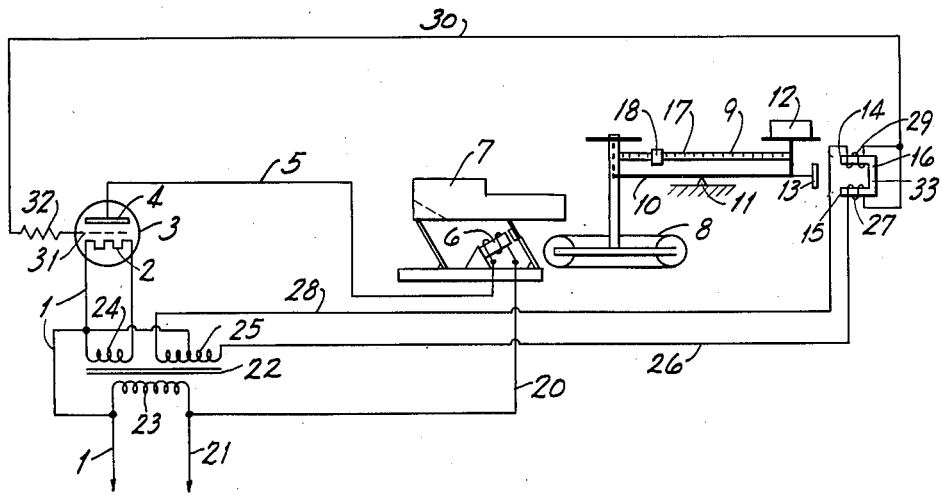
INVENTOR.
GEORGE KAST
BY
William D. Carruthers
HIS ATTORNEY.

Patented Nov. 18, 1952

2,618,406

UNITED STATES PATENT OFFICE 2,618,406

ELECTRONIC PICKUP CONTROL FOR GRAVIMETRIC FEEDERS

George Kast, Homer City, Pa., assignor to Syntron Company, Homer City, Pa., a corporation of Delaware Application March 9, 1950, Serial No. 148,645

2 Claims. (Cl. 222—55)

This invention relates generally to electronic control circuits and more particularly to an electronic magnetic pickup control circuit for a gravimetric feeder.

A gravimetric feeder is a machine for accurately weighing and feeding granular material continuously and consists of a vibratory conveyor that is mounted to supply material to a synchronously operating belt conveyor that is supported on a weighing device. The rate of feed of the vibratory feeder is automatically controlled by the movement of the balance beam on the weighing device which supports the constant speed conveyor belt. A variation in weight or load on the constant speed belt conveyor will move the balance beam that is effective in varying the current supplied to the vibratory feeder which in turn corrects the amount of material supplied to the constant speed belt and thus maintains an accurate feed of the continuously flowing material.

The object of this invention is the provision of a new and improved control circuit for the vibratory conveyor of a gravimetric feeder. The vibratory conveyors are preferably operated on pulsating current obtained from half wave rectification of alternating current. In this invention the rectified current pulsations are obtained by a thyratron having a control grid that is excited by a circuit from a magnetic pickup which is varied by the movement of the beam on the weighing device. The beam of the weighing device is caused to be moved by a variation in the weight of the material that is supplied to the constant speed conveyor supported thereby.

The magnetic pickup is excited with voltage supplied from a secondary of the transformer employed to furnish filament voltage. The secondary for exciting the magnetic pickup is provided with the center tap that is directly connected to the cathode of the thyratron. The output voltage from the magnetic pickup is applied to the grid of the tube. The phase relation of this grid voltage will vary with respect of the anode voltage depending upon the position of the movable armature of the magnetic pickup relative to the two poles of the same. The magnetic pickup is designed so that a small change in reluctance of the flux path through either coil of the pickup will result in considerable phase shifting of the output voltage. By reason of this design a very small movement of the armature can be made to produce a phase shift of 180° of the grid voltage relative to the anode voltage. The pole faces of the magnetic pickup are so arranged that the very small change in the movement of the armature on the weighing device about the balance point of the scale will be effective in controlling the phase shift of the grid voltage. The pickup coils and the excitation center tap transformer winding are chosen so that the output voltage will change from an in-phase to 180° lagging as the beam of the weighing device shifts from an underweight to an overweight about the balance point. Since the magnitude of the anode current will be a function of the phase of the grid voltage, then, likewise, the discharge rate of the vibratory feeder will vary from a maximum to zero as the weighing device swings from an underweight to an overweight position about the balance point.

Owing to the characteristics of this system, this circuit provides means for selecting a desired rate of feed merely by setting a poise on the weighing device to a corresponding selected weight to be fed per unit of time and any variation of this weight will be effective in controlling the anode current to vary the feed of the vibratory conveyor accordingly. By adjusting the spacing between the armature and the pole faces the sensitivity of the magnetic pickup unit may be changed. The rate of feed of the vibratory feeder can be made to automatically vary itself and keep the weighing device floating continuously about the balance point, thereby resulting in a very accurate average of material fed over a given period of time.

Other objects and advantages appear hereinafter in the following description and claims.

The accompanying drawings show for the purpose of exemplification, without limiting the claims thereto, certain practical embodiments of this invention wherein the view shown is a schematic diagram illustrating the electronic magnetic pickup control circuit comprising this invention.

Referring to the drawing, one side of the alternating current supply is connected by the line 1 to the filament or cathode 2 of the thyratron 3. The anode 4 of the thyratron is connected by the line 5 in series with the motor 6 of the vibratory conveyor 7. This conveyor is mounted to feed material to the constant or synchronous feed conveyor 8 that is supported on the weighing device 9 illustrated by the beam balance 10 mounted on the fulcrum 11 and wherein the synchronous conveyor is supported from one end of the beam 10 and the other end of the beam is arranged to carry the tareweight 12 to counterbalance the weight of the synchronous conveyor.

The beam also carries the armature 13 that is movable by the action of the beam across the pole faces 14 and 15 of the magnetic pickup 16. The weighing device is also provided with a marked beam indicated at 17 on which a poise 18 is adjustable for setting the amount of weight to be continuously conveyed.

The other side of the motor 6 of the vibratory conveyor member 7 is connected by the line 20 to the other side of the alternating current supply 21. A transformer 22 is provided with the primary 23 connected across the alternating current supply indicated at the lines 1 and 21 and is provided with a secondary 24 connected to supply a voltage to the filament 2.

The transformer 22 is also provided with a secondary 25, one end of which is connected by the line 26 to the coil 27 of the magnetic pickup 16. The other terminal of the secondary 25 is connected by the line 28 to the coil 29 of the magnetic pickup. The opposite ends of the coils 27 and 29 are connected together by the line 30 which is directly connected to the grid 31 through the current limiting resistor 32.

Each of the coils 27 and 29 of the magnetic pickup are mounted on opposite parts of the core member 33 which provide pole faces 15 and 14. The armature member is adjusted so that when the beam 10 of the weighing device oscillates, the armature 13 will be effective on either the pole face 15 or the pole face 14 depending upon whether the material on the synchronous conveyor 8 is lighter or heavier than the said amount as determined by the positioning of the poise 18. If the armature 13 is brought down to the pole face 15, the grid 31 is excited to increase the anode current so as to increase the flow by the vibratory conveyor 7. If, on the other hand, the armature 13 swings upwardly to the pole face 14, the phase of the grid voltage is shifted to reduce the output of the thyratron and thus decrease the supply of material by the conveyor 7. Thus, the magnetic pickup 16 is enabled to accurately control the constant flow of material from the gravimetric feeder.

I claim:

1. A control circuit for a gravimetric feeder having a vibratory conveyor mounted to supply material to a constant speed conveyor supported on a weighing device comprising a motor for said vibratory conveyor, a pickup consisting of an armature member and an electromagnetic field member having a pickup coil on each of two spaced poles of one core, one of said members mounted on said weighing device to move with a change of weight while the other is stationary and mounted in operative relation with the other member, a thyratron having its cathode provided with a connection to one side of an alternating current supply and its anode connected directly in series with the motor of said vibratory conveyor and a connection for the other side of said alternating current supply, one side of each pickup coil connected together and directly to the grid of the thyratron through a limiting resistor, and the other side of said pickup coils having connections for said alternating current potential with an intermediate potential point thereof connected to the cathode.

2. A control circuit for a gravimetric feeder having a vibratory conveyor mounted to supply material to a constant speed conveyor supported on a weighing device comprising a motor for said vibratory conveyor, a pickup consisting of an armature member and an electromagnetic field member having a pickup coil on each of two spaced poles of one core, said armature mounted on the weighing device to move with a change of weight across one pole or the other of the electromagnetic field member which is stationary and mounted in operative spaced relation with the armature, a thyratron having its cathode provided with a connection to one side of an alternating current supply and its anode connected directly in series with the motor of said vibratory conveyor and a connection for the other side of said alternating current supply, one side of each pickup coil connected together and directly to the grid of the thyratron through a limiting resistor, a transformer having its primary having terminals for connection with said alternating current source, a secondary of said transformer having its terminals connected respectively to the other ends of said pickup coils, and a mid tap on said secondary connected to said cathode.

GEORGE KAST.

REFERENCES CITED

The following references are of record in the file of this patent:

UNITED STATES PATENTS

| Number | Name | Date |
|---|---|---|
| 1,922,883 | Crago | Aug. 15, 1933 |
| 2,103,400 | Weckerly | Dec. 28, 1937 |
| 2,322,218 | Baird | June 22, 1943 |
| 2,323,440 | Baird | July 6, 1943 |